June 13, 1961 D. RICHMAN 2,988,592

AUTOMATIC-CHROMINANCE-CONTROL SYSTEM

Original Filed Nov. 16, 1956 3 Sheets-Sheet 1

June 13, 1961 D. RICHMAN 2,988,592

AUTOMATIC-CHROMINANCE-CONTROL SYSTEM

Original Filed Nov. 16, 1956 3 Sheets-Sheet 2

United States Patent Office 2,988,592

Patented June 13, 1961

2,988,592

AUTOMATIC-CHROMINANCE-CONTROL SYSTEM

Donald Richman, Fresh Meadows, N.Y., assignor to Hazeltine Research, Inc., Chicago, Ill., a corporation of Illinois Original application Nov. 16, 1956, Ser. No. 622,702, now Patent No. 2,936,332, dated May 10, 1960. Divided and this application Apr. 7, 1960, Ser. No. 20,776

1 Claim. (Cl. 178—5.4)

*General*

This invention relates to the color-signal or chrominance-signal decoder of a color-television receiver and, particularly, to automatic-chrominance-control (ACC) systems for use in such signal decoders to stabilize the gain of the chrominance signal.

This application is a divisional application of application Serial No. 622,702, filed November 16, 1956, now Patent No. 2,936,332.

Automatic-chrominance-control (ACC) in the chrominance channel of a color receiver is for the same purpose as automatic-gain-control (AGC) in a black-and-white television receiver and automatic-volume-control (AVC) in a sound receiver, namely, to hold the signal gain relatively constant. In color receivers, it is customary to utilize an AGC system for automatically controlling the gain of the radio-frequency and intermediate-frequency amplifiers. This serves to stabilize the gain of the monochrome as well as the chrominance portion of the color signal. A separate gain-control system, in this case an ACC system, is, nevertheless, needed to further control the gain of the chrominance signal to compensate for variations in the gain of such chrominance signal relative to the monochrome signal. Such variations arise because of the relatively wide band width of the color signal and because the monochrome- and chrominance-signal components are primarily located at opposite ends of the band. As a result, variations in antenna impedance match with frequency and variations in signal strength, due to multipath transmission, may produce substantial relative variations between the monochrome and chrominance signals.

It has been heretofore proposed to obtain automatic chrominance control by having at least one amplifier stage in the chrominance channel pass both the chrominance-signal proper and the subcarrier synchronizing burst and then to separate and rectify the burst to obtain an ACC bias which is then supplied back to the amplifier stage to control the gain thereof. This constitutes a simple form of automatic-gain-control and, as is known in the art, a better type of control action can be obtained if, instead, a "delayed" gain-control system is utilized. Delayed automatic-gain-control systems heretofore proposed generally utilize a biased diode which is coupled to the source of gain-control bias and which acts to keep the gain-control system disabled until the received signal reaches a desired strength. In this manner, the amplifier system being controlled may be designed to have optimum gain for weak signals, the automatic-gain-control action being disabled until the signal amplitude reaches a desired value and then going into operation fairly rapidly to hold the signal amplitude at approximately this desired value. It would be desirable to incorporate such delayed control action into the chrominance channel ACC system.

Another necessary feature of the chrominance-signal decoder is a color-killer circuit for disabling the chrominance channel during the reception of a black-and-white picture signal. Unless such circuit is utilized, the black-and-white picture would suffer from color distortion arising from the fact that the synchronous detectors of the chrominance channel are not properly synchronized during such reception.

Applicant has found a way of combining the color-killer and ACC circuits of the chrominance channel so as to obtain the advantage of delay automatic-gain-control without added expense or circuit complexity over that required for the color-killer circuit.

It is an object of the invention, therefore, to provide a new and improved automatic-chrominance-control system.

It is another object of the invention to provide a new and improved automatic-chrominance-control system for providing delayed gain control for the chrominance channel with a minimum of added expense and circuit complexity.

It is a further object of the invention to provide a new and improved automatic-chrominance-control system which combines the color-killer and ACC circuitry to obtain delayed ACC operation at no increased expense over that required for the color-killer circuit.

In accordance with the invention, an automatic-chrominance-control system for use in the chrominance-signal decoder of a color-television receiver comprises a chrominance-signal amplifier stage for translating a received chrominance signal including the subcarrier synchronizing bursts and a chrominance-signal synchronous demodulator stage for detecting a pair of color-difference signal components of the chrominance signal. The system also includes detector circuit means coupled to the output of the amplifier stage and responsive to the subcarrier synchronizing bursts for developing a control potential representative of the amplitude of the bursts. The system further includes circuit means for supplying the control potential to the synchronous demodulator stage to disable this stage when the burst amplitude is insufficient and to develop a voltage-delayed output potential when the burst amplitude is sufficient. In addition, the system includes circuit means for supplying the voltage-delayed output potential back to the amplifier stage in a degenerative manner for stabilizing the gain of the chrominance signal.

For a better understanding of the present invention, together with other and further objects thereof, reference is had to the following description taken in connection with the accompanying drawings, and its scope will be pointed out in the appended claims.

Referring to the drawings.

Figure 1:
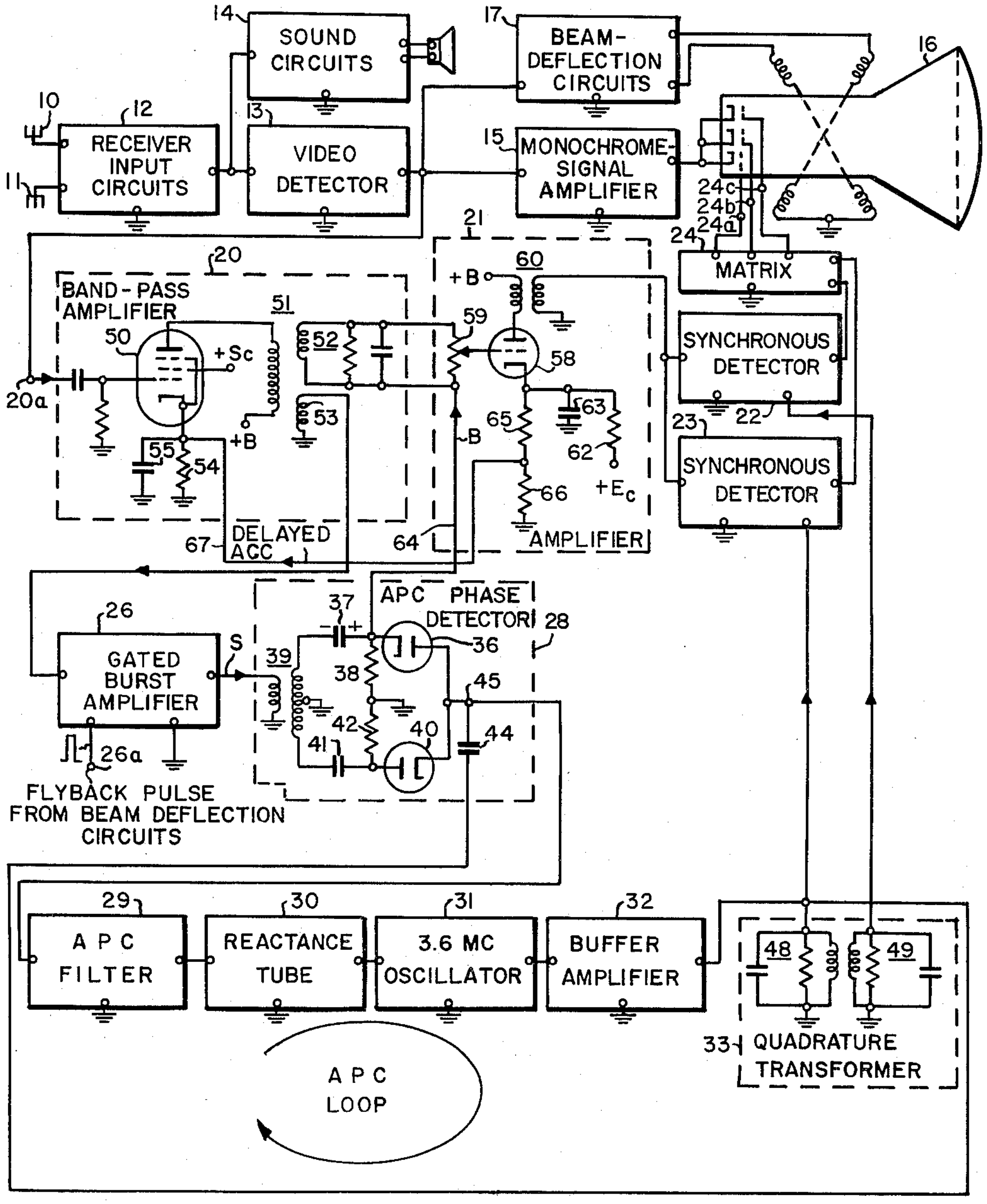
FIG. 1 is a circuit diagram, partly schematic, of a representative embodiment of a color-television receiver including a representative embodiment of an automatic-chrominance-control system constructed in accordance with the present invention.

*Color receiver of FIG. 1*

Referring to FIG. 1 of the drawings, there is shown a representative embodiment of a color-television receiver. The received color-television signal is supplied by way of an antenna system 10, 11 and receiver input circuits 12 to a video or second detector 13. The receiver input circuits 12 may include the usual radio-frequency amplifier, frequency converter, and intermediate-frequency amplifier. Sound circuits 14 may be coupled to the output of the unit 12.

The monochrome portion of the detected color signal is applied by way of a monochrome-signal amplifier 15 to the cathodes of a color picture tube 16 of, for example, the three-gun shadow-mask type. The field- and line-synchronizing pulses contained in the detected composite color signal are supplied to beam-deflection circuits 17 for controlling the generation of the usual scanning wave forms for producing the scanning raster of the picture tube 16.

The chrominance-signal portion of the composite detected signal, as well as the subcarrier synchronizing burst, are supplied by way of a band-pass amplifier 20 to a further amplifier 21. The chrominance signal is then applied to a pair of synchronous detectors 22 and 23. Locally generated reference signals of subcarrier frequency, namely 3.6 megacycles, and which are in phase quadrature are also supplied to the synchronous detectors 22 and 23 and serve to control the operation thereof so that a pair of color-difference signals is individually derived from the chrominance signal. These color-difference signals are then supplied to a matrix 24 for producing the red, green, and blue color-difference signals which are, in turn, supplied to the individual control electrodes of the color picture tube 16. Such picture tube is then effective to combine these color-difference signals with the monochrome signal applied to the cathodes to produce the desired color image on the phosphor screen of the tube 16.

The locally generated reference signals supplied to the synchronous detectors 22 and 23 are obtained from a controlled oscillator circuit which is maintained in synchronism with the subcarrier synchronizing burst by means of an automatic-phase-control (APC) loop or system. More particularly, the subcarrier synchronizing burst portion of the chrominance signal is obtained from the band-pass amplifier 20 and separated from the chrominance-signal proper by a gated burst amplifier 26 and then supplied to an automatic-phase-control (APC) phase detector 28. The burst amplifier 26 is gated by flyback pulses which may be obtained from the beam-deflection circuits 17 and supplied thereto by way of the terminal 26*a*. Coupled in cascade to the output of the APC phase detector 28 are an APC filter 29, a reactance tube 30, a 3.6-megacycle oscillator 31, a buffer amplifier 32, and a quadrature transformer 33. These latter units 28–33 make up the automatic-phase-control loop.

Considering briefly the operation of the APC loop, oscillations from the free-running 3.6-megacycle oscillator 31 are supplied by way of the buffer amplifier 32 back to the phase detector 28. The phase detector 28 comprises, basically, a pair of diode detector circuits coupled in phase opposition. One detector circuit includes a diode 36, a condenser 37, a resistor 38, and an upper half of the secondary winding of transformer 39. The other detector circuit includes a diode 40, a condenser 41, a resistor 42, and a lower half of the secondary winding of transformer 39. In the absence of a synchronizing burst, the continuous reference signal, which is supplied to the phase detector 28 by way of a condenser 44, energizes the two detector circuits equally so that the average potential at the common point 45 remains at 0 volts. Now, if the synchronizing burst is of the same frequency and in phase quadrature, that is, 90° out-of-phase with the reference signal, then this burst, as it appears across the two halves of the transformer 39 secondary winding, combines with the reference signal to produce resultant signals of equal amplitude across the two detector circuits. The direct-current potential point 45 then can remain stable at 0 volts and the oscillator 31 is said to be in synchronism with the synchronizing burst.

If the synchronizing burst is of the same frequency but not in phase quadrature, then the resultant signal across one of the detector circuits exceeds that across the other. This, in turn, causes a direct-current potential to appear at the common point or terminal 45, the polarity of the potential depending on whether the locally generated reference signal is leading or lagging the desired quadrature relationship with the synchronizing burst. As the synchronizing burst is not continuous in nature but rather comes in periodic bursts, the signal at the terminal 45 tends to be periodically applied as pulses. These relatively high-frequency pulses (15 kc. line pulse rate) are averaged out or smoothed out by the condensers 37 and 41 as well as by the APC filter 29 which is a form of low-pass filter to develop a corresponding potential which is then applied to the reactance tube 30 to control the operating frequency and phase of the oscillator 31 so as to maintain the output signal thereof in phase quadrature with the received synchronizing burst. The operation when the synchronizing burst and the locally generated reference signals are not of the same frequency is a bit more complicated and may best be understood by realizing that when two signals are not of the same frequency, then they are continually varying in phase relative to one another. As a result, the potential at terminal 45 is continually varying from one extreme to the other. This potential variation is commonly referred to as a "beat note." Because the phase detector 28 is included in a feedback loop, namely the APC loop, the control action of the loop in trying to pull the two signals into synchronism causes the beat-note variations to be asymmetrical in nature relative to the zero voltage axis. This results in a direct-current component which causes the oscillator 31 to pull into synchronism after which the normal phase-control action just discussed is effective to hold the oscillator 31 in synchronism.

A pair of quadrature-phased reference signals for the synchronous detectors 22 and 23 is obtained by means of the quadrature transformer 33 which includes a primary winding included in a tuned circuit 48 and a secondary winding included in a tuned circuit 49. This circuit 33 produces a 90° phase shift at resonance, in this case at 3.6 megacycles. In other words, the signal across the primary tuned circuit 48 is in phase with the oscillator whereas the signal across the secondary tuned circuit 49 is in phase quadrature.

Automatic-phase-control systems or APC loops such as that just described are described in greater detail in a pair of technical articles written by applicant, both appearing in the January, 1954 issue of the Proceedings of the I.R.E. One article is entitled "Color-Carrier Reference Phase Synchronization Accuracy in NTSC Color Television" and appears at page 106 while the other article is entitled "The D.C. Quadricorrelator: A Two-Mode Synchronization System" and appears at page 288. Such systems are also described in chapter 10, pages 170–199, inclusive, of a book entitled Principles of Color Television by The Hazeltine Laboratories Staff, published by John Wiley & Sons, Inc., New York, 1956. Accordingly, such systems need not be discussed in greater detail herein.

*Description of ACC system of FIG. 1*

Considering now the automatic-chrominance-control system of FIG. 1 which illustrates a representative embodiment of the present invention, such system includes a chrominance-signal amplifier stage, represented by the band-pass amplifier 20, for translating a received chrominance signal including the subcarrier synchronizing bursts. More particularly, such amplifier stage 20 includes an electron-discharge device such as a vacuum tube 50 for amplifying the chrominance signal. Such signal is then coupled by way of a transformer 51 to a tuned circuit 52 which includes the secondary of the transformer 51. Transformer 51 also includes a burst take-off winding 53. The amplifier 20 also includes a self-biasing network comprising a resistor 54 and a condenser 55 coupled to the cathode of tube 50.

The ACC system of FIG. 1 also includes a second stage for further processing the chrominance signal. As represented in the FIG. 1 embodiment, this second stage may comprise a second chrominance-signal amplifier stage 21 which includes an electron-discharge device or vacuum tube 58 for further amplifying the chrominance signal. The input circuit of amplifier 21 is coupled to the band-pass amplifier 20 by way of the potentiometer 59 while the output circuit thereof is coupled to the synchronous detectors 22 and 23 by way of an output transformer 60.

The ACC system may also include a gated amplifier circuit coupled to the output of the first amplifier stage 20 for separating and translating the subcarrier synchronizing burst portion of the received chrominance signal. Such gated amplifier circuit is represented by the gated burst amplifier 26.

The ACC system further includes detector circuit means coupled to the output of the amplifier stage 20, in this case by way of the gated burst amplifier 26, and responsive to the subcarrier synchronizing bursts for developing a control potential representative of the amplitude of the bursts. As shown in the FIG. 1 embodiment, this detector circuit means may take the form of an amplitude-sensitive detector circuit such as the APC phase detector 28, in which case the voltage at one terminal of the APC phase detector 28 may be used as the ACC control potential. As shown, the voltage across the resistor 38 is so used. As an alternative, a separate diode detector, separate and apart from the APC phase detector 28, might, instead, be used to rectify the sync bursts to develop the desired control potential. Where possible, however, it is more economical to make use of a circuit already present in the receiver.

The ACC system also includes circuit means for supplying the control potential developed by the last-mentioned detector circuit means to the second stage represented, in this case, by the amplifier 21 to disable this stage when the burst amplitude is insufficient and to develop a voltage-delayed output potential when the burst amplitude is sufficient. This circuit means includes circuit means for biasing the electron-discharge device 58 of the second stage 21 to a nonconductive condition. Such bias circuit means may include a resistor 62 and a source of biasing potential $+E_c$. A by-pass condenser 63 may also be provided for by-passing the cathode of tube 58 to ground for the chrominance signal. This circuit means also includes circuit means for supplying the control signal to the electron-discharge device 58 to cause conduction therein and to control the magnitude thereof. Such means may include a conductor 64 connected between the phase detector 28 and the potentiometer 59 as well as the potentiometer 59 itself.

The ACC system also includes circuit means for supplying the voltage-delayed output potential of the second stage back to the first chrominance-signal amplifier stage 20 in a degenerative manner for stabilizing the gain of the chrominance signal. This circuit means may include resistors 65 and 66 which are responsive to the conduction of the tube 58 for developing the output potential and may also include a conductor 67 for applying the delayed output or control potential back to the cathode of the tube 50. The polarity of this direct-current control potential is such that when applied to the cathode of the tube 50 it tends to reduce the gain of such tube. In the embodiment shown, this potential is of positive polarity. Where desired, however, the feedback connections between the amplifiers 21 and 20 may be rearranged to develop a control potential of negative polarity which may then be applied to a control electrode such as the control grid or the screen grid of the tube 50.

*Operation of ACC system of FIG. 1*

Considering now the operation of the automatic-chrominance-control system just described, the composite but time-spaced chrominance signals and subcarrier synchronizing bursts are supplied by way of terminal 20*a* to the band-pass amplifier 20. The chrominance signal is then supplied by way of transformer 51 and tuned circuit 52 to the second chrominance-signal amplifier 21. The subcarrier synchronizing burst is supplied by way of the burst take-off winding 53 to the gated burst amplifier 26 which is gated on only during the synchronizing burst intervals by the line flyback pulses supplied thereto by way of terminal 26*a*. In this manner, only the periodic subcarrier synchronizing bursts are supplied to the APC phase detector 28.

Figure 2:
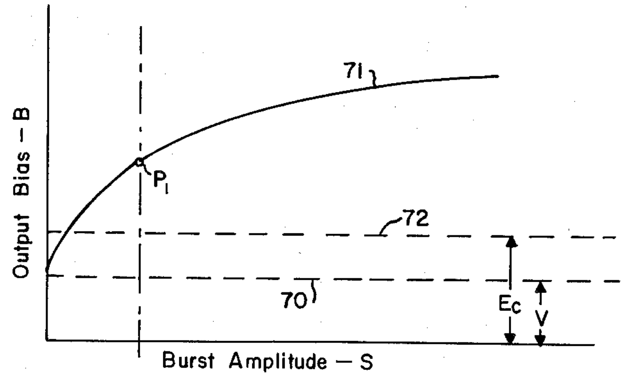
FIG. 2 is a graph used in explaining the operation of the automatic-chrominance-control system of FIG. 1.

Considering the operation of the detector circuit portion of the phase detector 28 which is used to develop the control potential, that is, the ACC control bias, a direct-current potential or ACC control bias is developed by the upper detector circuit across the condenser 37 as a result of detection of the synchronizing bursts. As indicated, this ACC potential is of positive polarity and its magnitude is related to the amplitude of the subcarrier bursts supplied by the burst amplifier 26. The relationship between the burst amplitude "S" and the ACC bias "B" developed across the condenser 37 is shown in the graph of FIG. 2. The potential level "V" represented by the broken line 70 is the residual direct-current potential developed across the condenser 37 due to rectification of the locally generated reference signal supplied to the phase detector 28 by way of the condenser 44. Curve 71 represents the additional potential resulting from the presence of the subcarrier bursts.

The ACC control potential developed across the condenser 37 is then supplied by way of the conductor 64 to the control electrode of the tube 58 of amplifier 21. As mentioned, this amplifier is normally biased to a nonconductive condition by means of the bias voltage $+E_c$ supplied by way of the resistor 62. This bias level is indicated by the broken line 72 of the FIG. 2 graph. As a result, as the amplitude of the subcarrier burst increases, a point is reached at which the tube 58 is rendered conductive. Subsequent increases in the ACC control potential cause corresponding increases in the conduction through the tube 58. Current flow through tube 58 passes through the resistors 65 and 66 and develops at the junction thereof a direct-current potential which is proportional to the ACC control potential supplied to the control electrode of the tube 58. Because of the cathode connection, this potential is likewise of positive polarity. Alternating-current components making up the chrominance signal are by-passed around these resistors by the condenser 63. In this manner, there is developed at the junction of the resistors 65 and 66 an ACC control potential which is proportional to the amplitude of the subcarrier burst. This ACC control potential is then supplied back by way of the conductor 67 to the cathode of the tube 50 of the band-pass amplifier 20 to stabilize the gain of the chrominance signal translated thereby. This control potential is of such polarity as to reduce the gain of the tube 50.

If the amplitude of the subcarrier burst supplied to the band-pass amplifier 20 increases, then the amplitude of the ACC control potential which is fed back to this amplifier increases and, hence tends to decrease the gain of the tube 50 to compensate for the increased burst amplitude. Because the burst amplitude is also representative of the chrominance-signal amplitude, this, likewise, compensates for the increased amplitude of the chrominance signal. When the input chrominance and burst signals decrease in amplitude, the reverse type of modification occurs. In this manner, both the chrominance-signal gain and the burst gain are stabilized. As such time, the operating point on the FIG. 2 graph might be represented by point $P_1$.

The voltage delay afforded by the biasing of the amplifier stage 21 serves to enhance the automatic-gain-control action by increasing its sensitivity in a manner similar to conventional delayed automatic-gain-control systems. In other words, when the signal level is below the biasing level 72, a fixed gain-control potential is supplied back to the first amplifier stage 20. As a result, the retarding action of the gain-control loop in opposing further increases in signal amplitude is not present. After the signal amplitude increases above the biasing level 72, then the automatic control system goes into operation very rapidly and tends to hold the signal gain constant. This strong and sudden control action represents, in effect, a higher degree of loop gain. An ideal gain-control system would hold the gain constant at approximately the biasing level 72 but such ideal systems require substantial amounts of loop gain and are not economically feasible in receivers for the competitive market. Accordingly, as indicated in FIG. 2, the system would more likely be stabilized at a point $P_1$ due to the lack of perfect control action.

The ACC control potential developed across the condenser 37 in addition to serving as an ACC control potential also acts as a color-killer control potential and serves to disable the chrominance-signal channel when other than a color signal is being received. This occurs because at such times no subcarrier synchronizing burst is received and, hence, the ACC control potential is less than the biasing potential $+E_c$. As a result, the second amplifier 21 is disabled thus disabling the chrominance-signal channel. This dual function points up the primary feature of the present invention, namely, that a color-killer circuit is normally required in a color receiver and, hence, by combining the ACC therewith in the novel manner taught by the present invention, "delayed" ACC is obtained at no added expense.

Figure 3:
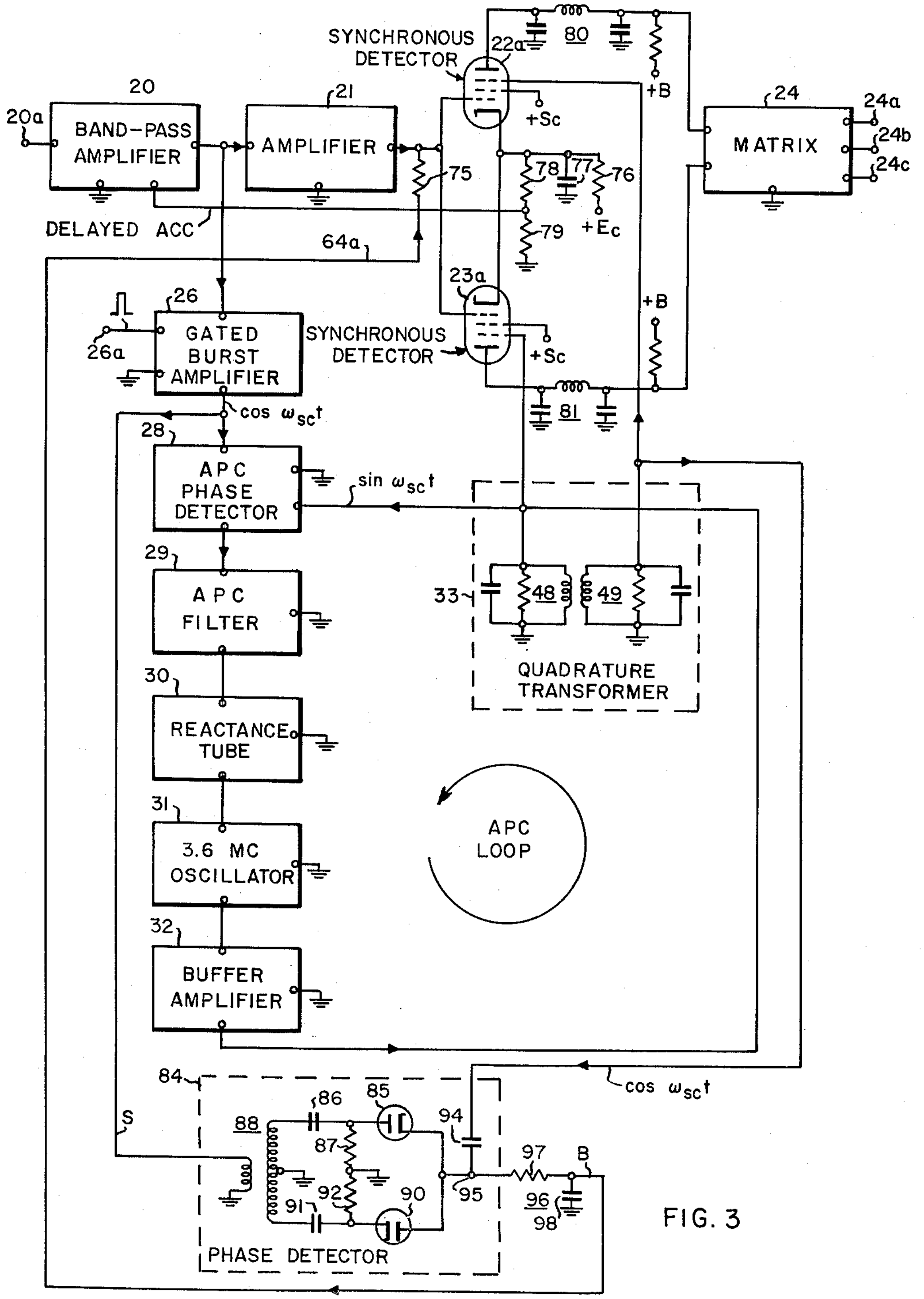
FIG. 3 is a circuit diagram of a chrominance-signal decoder including another form of automatic-chrominance-control system constructed in accordance with the present invention.

*Description and operation of ACC system of FIG. 3*

Referring now to FIG. 3 of the drawings, there is shown a modified form of chrominance-signal decoder which may be used in the color-television receiver of FIG. 1. The units of the FIG. 3 decoder which are the same as those of the FIG. 1 decoder are indicated by corresponding reference numerals. The FIG. 3 decoder may be substituted in the FIG. 1 color receiver by connecting the terminals **20*a* and 24*a*–24*c***, inclusive, to the correspondingly designated terminals of the FIG. 1 receiver. The FIG. 3 decoder includes two major modifications of the decoder of FIG. 1 and either of these modifications may be made independently of the other.

The first modification relates to the chrominance-channel stage which is utilized to provide the voltage delay for the ACC control potential. In the FIG. 3 decoder such second stage for providing the voltage delay is the chrominance-signal synchronous demodulator stage, which stage includes a pair of synchronous detectors **22*a* and 23*a* corresponding to the synchronous detectors 22 and 23 of FIG. 1. In this case, the ACC control potential is supplied by way of a conductor 64*a* and a resistor 75 to the control electrodes of each synchronous detector. The synchronous detectors 22*a* and 23*a* are normally biased to a nonconductive condition by the biasing potential $+E_c$ supplied by way of a resistor 76 to the cathodes thereof. A by-pass condenser 77 is also coupled to the cathodes as are series-connected resistors 78 and 79 at the junction of which is developed the delayed ACC control potential which is supplied back to the first stage represented by the band-pass amplifier 20**.

With regard to the normal operation of the synchronous detectors, the locally generated and quadrature-phase reference signals are supplied to the suppressor electrodes of the synchronous detectors **22*a* and 23*a* as indicated in the drawings. The corresponding color-difference signals are then supplied by way of low-pass filters 80 and 81, respectively, to the matrix 24**.

As illustrated by the foregoing, the voltage delay for the ACC control potential may be developed by any one of the various circuits or stages subsequent to the stage which is being controlled by the ACC control potential. Color killing is obtained as before but in this case it is the synchronous detectors **22*a* and 23*a*** which are disabled.

Another modification shown in the FIG. 3 decoder relates to the means utilized for developing the ACC control potential in the first place. In this decoder, a portion of the APC phase detector 28 is not utilized as an envelope detector but, rather, a separate synchronous phase detector 84 is utilized to develop the ACC control potential. Circuit-wise, this phase detector 84 may be similar to the phase detector 28 shown in detail in FIG. 1 in that it may include a pair of diode detector circuits. One of these circuits includes a diode 85, a condenser 86, a resistor 87, and the upper half of the transformer 88 secondary winding while the other diode detector circuit includes a diode 90, a condenser 91, a resistor 92, as well as the lower half of the transformer 88 secondary winding. There are however, two important distinctions. One distinction relates to the phase of the reference signal supplied back to the phase detector 84. More particularly, when the oscillator 31 of the APC loop is in synchronism with the received subcarrier burst, the local reference signal which is supplied by way of a condenser 94 to the phase detector 84 includes a substantial component which has a phase identical to the phase of the synchronizing burst. This results in a different mode of operation from that of the APC phase detector 28, it being remembered that the reference signal supplied to the APC detector 28 is in phase quadrature with the burst. Another distinction of phase detector 84 over the APC phase detector 28 is the point in the circuit at which the ACC control potential is derived. In the case of the phase detector 84 the control potential is developed at the terminal 95. In this case, the ACC control potential represents the resultant obtained by combining the individual signals developed by the two diode detector circuits of the phase detector 84.

Because of the phase of the locally generated reference signal, the operating characteristic relative to terminal 95 of the phase detector 84 is such that the in-phase component produces a maximum output when the APC loop is in synchronism and substantially zero average output when not in synchronism. When the APC loop is in synchronism, the magnitude of the output of phase detector 84 is determined by the amplitude of the input synchronizing burst and the relationship therebetween is shown by curve 99 of the graph of FIG. 4. Such output bias or ACC control potential at the terminal 95 is supplied by way of a low-pass filter 96, which may include a resistor 97 and a condenser 98, to the appropriate stage for furnishing the voltage delay and, then, to the amplifier stage which is to be controlled. In this manner, the operation of the ACC system may be maintained, for example, at the operating point $P_1$ of FIG. 4. The operation of the ACC system during oscillator synchronism is substantially similar to the operation of the FIG. 1 system. Any variation in the amplitude of the input synchronizing bursts at the terminal **20*a* results in an inverse variation of the gain of the band-pass amplifier 20. The control action for weak signals is again enhanced by the voltage delay provided by the biasing of the second stage, in this case the stage comprising the synchronous detectors 22*a* and 23*a*. Color-killing operation, which in this case involves disabling the synchronous detectors 22*a* and 23*a***, is also analogous to that of the FIG. 1 system.

One advantage of the separate phase detector 84 arises when the local oscillator 31 is out of synchronism. In this case, the phase detector 84 produces 0 volts of direct-current output on the output side of the low-pass filter 96 even in the presence of much noise. Actually, during such nonsynchronous condition, the synchronizing burst and the local reference signals supplied to the phase detector 84 produce a sinusoidal beat-note variation. This variation, however, is symmetrical in wave form, does not produce a direct-current component, and, hence, results in no signal component which passes through the low-pass filter 96.

Figure 4:
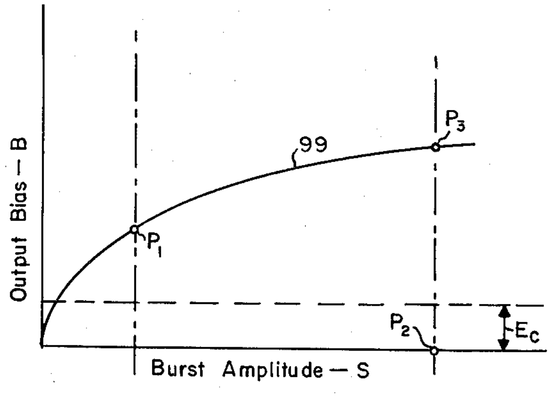
FIG. 4 is a graph utilized in explaining the operation of the automatic-chrominance-control system of FIG. 3.

With reference to FIG. 4, the operating point at this time is represented by a point $P_2$. Accordingly, no ACC control bias is supplied back to the band-pass amplifier 20. This enables the amplifier 20 to have maximum gain and, hence, to supply subcarrier synchronizing bursts of maximum amplitude to the APC loop as well as to the additional phase detector 84. This increase in the amplitude of the burst supplied to the APC loop renders the operation of such loop more sensitive and, hence, enables the oscillator 31 to be pulled into synchronism more quickly. This increase in sensitivity of the APC loop when the oscillator is not in synchronism represents a two-mode type of operation as discussed more fully in the previously mentioned technical articles and is highly desirable for such APC loops. In this manner, the ACC system of FIG. 3, which might be termed a "synchronous" ACC system because it only provides an ACC control potential when the local subcarrier oscillator 31 is in synchronism, also produces, at no additional expense, the desirable two-mode operation of the APC loop. As soon as the APC loop is pulled into synchonism, a direct-current output potential appears at terminal 95 and the operating point on the FIG. 4 graph immediately shifts to point $P_3$. The operating point is subsequently shifted to the point $P_1$ due to the ACC control action.

Another advantage of the separate phase detector 84 is that the ACC control action is more immune to undesired electrical noise as such noise is averaged out by the circuit.

The present system also improves the color-killer action in that the chrominance-signal channel, in particular the synchronous detectors **22*a* and 23*a*, is now disabled when the local oscillator 31 is not in synchronism with the burst. This is because no ACC control bias is then being supplied to overcome the bias of the synchronous detector cathodes. In this manner, the color killing might also be termed "synchronous" color killing as it depends on the state of synchronism of the local oscillator 31**.

The use of the separate phase detector 84 in developing the ACC control potential represents a novel invention apart from whether the further feature of delayed gain-control action is utilized and, hence, has been made the subject matter of applicant's copending application entitled "Automatic-Chrominance-Control System," Serial No. 622,703, filed November 16, 1956, now Patent No. 2,922,839.

Figure 5:
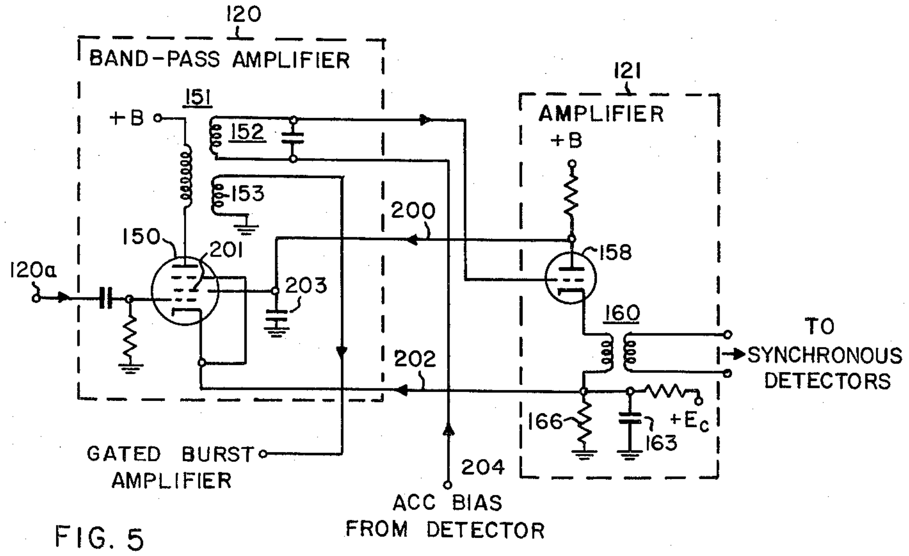
FIG. 5 is a circuit diagram illustrating an alternative form of amplifier system for use with the automatic-chrominance-control system.

*FIG. 5 amplifier circuits*

Referring now to FIG. 5 of the drawings, there is shown an alternative method of interconnecting the band-pass amplifier and the subsequent amplifier which provides the voltage delay for the ACC control potential. The two amplifier circuits 120 and 121 of FIG. 5 are similar to the corresponding amplifiers 20 and 21 of FIG. 1 and corresponding parts are indicated by corresponding reference numerals preceded, however, by a one. The important feature of the interconnection of the amplifiers 120 and 121 of FIG. 5 is that the potential variation at the anode of tube 158 is coupled back by way of a conductor 200 to the screen electrode 201 of the first tube 150. As before, the cathode potential variation of tube 158 may be supplied back by way of a conductor 202 to the cathode of tube 150. The screen bypass condenser 203 suitably by-passes any chrominance-signal variations so that the potential fed back to the screen electrode 201 is primarily representative of the ACC control potential supplied to the terminal 204.

The use of the additional feedback path to the screen electrode 201 serves to more strongly control the gain of the tube 150. Hence, in effect, a higher degree of loop gain is provided hence enabling improved ACC control action. The control potential fed back to the screen electrode 201 by way of conductor 200 is degenerative in nature because, for example, if the burst amplitude increases, then the ACC potential supplied by way of terminal 204 increases conduction in tube 158 which, in turn, decreases the anode voltage which, in turn, decreases the potential of screen electrode 201 hence decreasing the gain of tube 150 and, correspondingly, the amplitude of the burst signal translated by tube 150.

*Conclusion*

From the foregoing descriptions of the various embodiments of the invention, it will be apparent that an automatic-chrominance-control system constructed in accordance with the present invention represents a novel and attractive way of combining the ACC and color-killer circuitry to obtain delayed ACC operation without increased expense or circuit complexity over that required for the normal color-killer circuit.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

An automatic-chrominance-control system for use in the chrominance-signal decoder of a color-television receiver, the system comprising: a chrominance-signal amplifier stage for translating a received chrominance signal including the subscriber synchronizing bursts; a chrominance-signal synchronous demodulator stage for detecting a pair of color-difference signal components of the chrominance signal; detector circuit means coupled to the output of the amplifier stage and responsive to the subcarrier synchronizing bursts for developing a control potential representative of the amplitude of the bursts; circuit means for supplying the control potential to the synchronous demodulator stage to disable this stage when the burst amplitude is insufficient and to develop a voltage-delayed output potential when the burst amplitude is sufficient; and circuit means for supplying the voltage-delayed output potential back to the amplifier stage in a degenerative manner for stabilizing the gain of the chrominance signal.

No references cited.